United States Patent
Naarmann

[11] 3,853,937
[45] Dec. 10, 1974

[54] N-(1-ALKENYL)-PEROXYCARBONIC ESTERS

[75] Inventor: Herbert Naarmann, Wattenheim, Germany

[73] Assignee: Badische Anilin- & Soda-Fabrik Aktiengesellschaft, Ludwigshafen/Rhein, Germany

[22] Filed: Apr. 5, 1973

[21] Appl. No.: 348,180

[52] U.S. Cl. ... 260/453 R, 260/89.5 R, 260/92.8 R, 260/93.5 R, 260/94.6, 260/544 C
[51] Int. Cl............................................. C07c 69/00
[58] Field of Search................ 260/453 RZ, 544 C

[56] References Cited
UNITED STATES PATENTS
| | | | |
|---|---|---|---|
| 3,264,274 | 8/1966 | Leveskis | 260/453 R |
| 3,576,826 | 4/1971 | Bafford et al. | 260/453 R |

FOREIGN PATENTS OR APPLICATIONS
| | | | |
|---|---|---|---|
| 1,184,618 | 3/1970 | Great Britain | 260/453 R |
| 584,709 | 12/1956 | Canada | 260/453 R |
| 1,901,542 | 8/1970 | Germany | 260/544 C |

OTHER PUBLICATIONS
Kiefer et al., "N-(1-Alkenyl)Carbamoyl Chlorides" (1970), CA 73 No. 99636d. (1970).

*Primary Examiner*—Glennon H. Hollrah
*Attorney, Agent, or Firm*—Johnston, Keil, Thompson & Shurtleff

[57] ABSTRACT

Organic peroxides of the formula

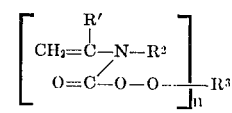

in which $R^1$ is hydrogen or methyl; $R^2$ is alkyl, cycloalkyl, aralykl or aryl or up to fourteen carbon atoms; $R^3$ is tertiary alkyl or cycloalkyl of up to ten carbon atoms or ditertiary alkylene of eight to ten carbon atoms and $n$ is 1 or 2. The new peroxides are suitable for the production of polymers containing isocyanate groups which are easily crosslinkable.

2 Claims, No Drawings

N-(1-ALKENYL)-PEROXYCARBONIC ESTERS

The invention relates to novel organic peroxides of the formula:

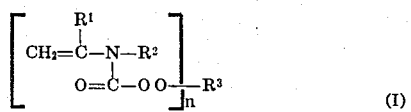
(I)

in which
R$^1$ is hydrogen or methyl;
R$^2$ is alkyl, cycloalkyl, aralkyl or aryl of up to fourteen carbon atoms;
R$^3$ is tertiary alkyl or cycloalkyl of up to ten carbon atoms or ditertiary alkylene of eight to ten carbon atoms; and
n is 1 or 2.

Organic peroxides of formula (I) may be prepared by reacting a carbamyl halogen compound of the formula

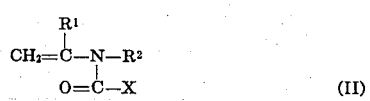
(II)

in which R$^1$ and R$^2$ have the meanings given above and X is chlorine or bromine with an organic hydroperoxide of the general formula:

$$R^3-(OOH)_n$$
(III)

in which R$^3$ and n have the meanings given above, in the presence of a tertiary amine or an inorganic base as a hydrogen halide acceptor and in the presence of an inert solvent.

In the preferred starting materials of formula (II) R$^1$ is hydrogen or methyl and R$^2$ is alkyl of one to twelve carbon atoms, cycloalkyl of six to eight carbon atoms, aralkyl of seven to eight carbon atoms or phenyl. Starting materials of formula (II) in which R$^1$ is hydrogen or methyl and R$^2$ is tertiary alkyl of four to eight carbon atoms and particularly tert-butyl have acquired special industrial significance.

In the preferred starting materials of formula (III) R$^3$ is tertiary alkyl of four to eight carbon atoms and particularly tert-butyl or ditertiary saturated alkylene of eight to ten carbon atoms.

Naturally the preferred starting materials result in preferred organic peroxides of formula (I).

The reaction is carried out in the presence of a tertiary amine, preferably a tertiary alkylamine whose alkyl groups have one to five carbon atoms such as triethylamine, tributylamine or trimethylpentylamine. Other suitable tertiary amines are those containing the nitrogen atom as part of a heterocyclic aromatic ring such as pyridine, lutidine, quinoline or imidazole. Other suitable hydrogen halide acceptors include inorganic bases such as hydroxides or carbonates of alkali metals or of alkaline earth metals, particularly alkali metal hydroxides, for example sodium hydroxide or potassium hydroxide.

It is advantageous to use from 1 to 1.5, particularly from 1 to 1.1, equivalents of a tertiary amine or inorganic base per mole of starting material of formula (II).

It is advantageous to carry out the reaction at a temperature of from −10° to +50°C. Particularly good results are obtained when a temperature of from 0° to 30°C is used.

One equivalent of carbamyl halide of formula (II) is generally reacted with one equivalent of a hydroperoxide of formula (III). It is advantageous to use the hydroperoxide of formula (II) in an excess of for example up to 50 percent molar.

Chlorohydrocarbons such as methylene chloride, chloroform or an ether such as dioxane, or an alkanol of one to four carbon atoms or water are advantageously used as solvents.

Carbamyl chlorides of formula (II) may be obtained for example by treatment of a Schiff's base with phosgene according to German Laid-Open Specification No. 1,901,542.

The invention is based on the following general concept: the new peroxides of formula (I) are not only superior initiators for free-radical polymerization of vinyl monomers or for grafting and crosslinking of polymers (because of their favorable half-life for example of from about three to ten minutes at 70°C (depending on the medium) for t-butyl N-vinyl-N-tert-butylperoxycarbamate) but they also permit the introduction of reactive groups during the polymerization or into the finished polymer. Peroxides of formula (I) decompose for example into vinyl isocyanate according to the following equation:

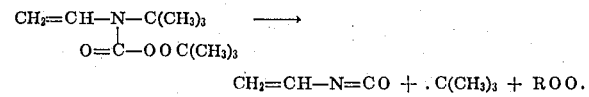

A new group of peroxides is therefore now available which make it possible to initiate polymerization and at the same time to introduce into the polymer reactive groups which are capable of further reactions under mild conditions.

For example peroxides of formula (I) are suitable for simultaneous polymerization and modification with groups containing isocyanate of acrylic esters, styrene, vinyl chloride or butadiene. Polymers containing isocyanate groups which have been prepared in this way can easily be crosslinked under mild conditions with prior art correctives such as diols or other bifunctional compounds containing hydrogen.

Finished polymers may also be modified and isocyanate groups may be introduced into them by means of the new peroxides of formula (I). Examples of suitable polymers are polyolefins, polystyrene and polybutadiene.

The present invention will be illustrated in the following Examples in which parts are by weight. Unless otherwise stated, K values are determined according to H. Fikentscher, Cellulosechemie, 13, 60 (1932), in 1 percent solution in toluene.

EXAMPLE 1

A solution of 16.15 parts of N-vinyl-N-tert-butylcarbamyl chloride in 20 parts by volume of methylene chloride is allowed to flow within twenty minutes at 10°C into a solution of 12.2 parts of 2.6 lutidine and 10 parts of tert-butyl hydroperoxide in 30 parts by volume of methylene chloride. The whole is then stirred for two hours at 25°C and allowed to stand for another forty-eight hours at +3°C. The solution is then washed with dilute caustic soda solution and water until neutral and chromatographed with methylene chloride in a column of aluminum oxide. 19.75 parts (90 percent of theory) of γ-tert-butylperoxycarbamic ester having a melting point of 31° to 33°C is obtained after evaporating the solvent in vacuo.

|  | C% | H% | N% | Active oxygen% |
|---|---|---|---|---|
| Calculated: | 61.4 | 9.76 | 6.51 | 14.9 |
| Found: | 61.2 | 9.7 | 6.0 | 14.1. |

EXAMPLE 1a 10 parts of the peroxide according to Example 1 is added to 100 parts of styrene, heated at 100°C for ten hours and treated in vacuo for three hours at 0.1 mm of Hg and 100°C. 106 parts of polymer is obtained which has a K value of 49 and contains 2.8 percent by weight of isocyanate.

EXAMPLE 2

16.15 parts of N-tert-butyl-N-vinylcarbamyl chloride dissolved in 20 parts by volume of methylene chloride is allowed to flow with vigorous stirring at 75°C into a suspension of 4.0 parts of sodium hydroxide in 5 parts by volume of water and 11 parts of tert-amylhydroperoxide in 30 parts by volume of methylene chloride. The reaction mixture is stirred for another two hours at 25°C and washed until neutral. The reaction mixture is chromatographed with petroleum ether over a short aluminum oxide column and the solvent is evaporated in vacuo. 19.05 parts (85 percent of theory) of γ-tert-amylperoxycarbamic ester is obtained. $n_D^{20} = 1.5215$. It contains less than 2 percent of N-tert-butyl-N-vinylcarbamyl chloride according to the infrared spectrum.

|  | C% | H% | N% | Active oxygen% |
|---|---|---|---|---|
| Calculated: | 62.87 | 10.04 | 6.12 | 13.95 |
| Found: | 62.4 | 9.7 | 5.9 | 13.0. |

EXAMPLE 3

32.3 parts of N-vinyl-N-tert-butylcarbamyl chloride dissolved in 15 parts by volume of methylene chloride is allowed to flow at 0°C within twenty minutes into 18 parts of 2,5-dimethyl-2,5-dihydroperoxyhexane and 16 parts of pyridine in 40 parts by volume of methylene chloride. The reaction mixture is then stirred for three hours at 5°C and for another hour at 25°C. The reaction mixture is worked up as described in Example 1. 40.5 parts (94.5 percent of theory) of 2,5-bis-(N-vinyl-N-tert-butylaminocarbonylperoxy)-2,5-dimethylhexane is obtained having a melting point of 53° to 54°C. The compound contains practically no starting material according to the infrared spectrum.

|  | C% | H% | N% | Active oxygen% |
|---|---|---|---|---|
| Calculated: | 61.6 | 9.35 | 6.55 | 14.9 |
| Found: | 61.2 | 9.2 | 6.55 | 13.5. |

EXAMPLES 3a TO 3c

The peroxide described in Example 3 is used for polymerization, in each case in an amount of 10 parts.
Procedure and results are as follows:

a. 100 parts of ethylene in 100 parts of cyclohexane is polymerized for ten hours at 300 atmospheres gauge at 80°C under nitrogen. The yield (in each case after removal of the solvent as described in Example 1a) is 90 parts with a K value of 34 and containing 1.9 percent of isocyanate.

b. 50 parts of butadiene and 50 parts of styrene in 100 parts of toluene are polymerized for ten hours at 10 atmospheres gauge at 90°C under nitrogen. The yield is 80 parts with a K value of 89 (partly cross-linked) and containing 2.3 percent of isocyanate.

c. 100 parts of ethyl acrylate in 100 parts of dioxane is polymerized for ten hours at 80°C under nitrogen. The yield is 105 parts with a K value of 38 and containing 2.1 percent of isocyanate.

I claim:

1. An organic peroxide of the formula (I):

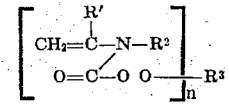

in which
R$^1$ is hydrogen or methyl;
R$^2$ is tertiary alkyl of four to eight carbon atoms;
R$^3$ is tertiary alkyl of four to eight carbon atoms or ditertiary alkylene of eight to ten carbon atoms; and
n is 1 or 2.

2. An organic peroxide as claimed in claim 1 where both R$^2$ and R$^3$ are tertiary butyl.

* * * * *

UNITED STATES PATENT AND TRADEMARK OFFICE
CERTIFICATE OF CORRECTION

PATENT NO. : 3,853,937

DATED : December 10, 1974

INVENTOR(S) : Herbert Naarmann

It is certified that error appears in the above-identified patent and that said Letters Patent are hereby corrected as shown below:

In the heading, insert--[30] Foreign Application Priority Data, April 15, 1972, Germany, P 22 18 365.9--;

Signed and Sealed this eighth Day of June 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,853,937   Dated December 10, 1974

Inventor(s)  Herbert Naarmann

It is certified that error appears in the above-identified patent and that said Letters Patent are hereby corrected as shown below:

Column 1, line 6, delete "O=C-O O-$R^3$" and insert

-- O=C-O-O-$R^3$ --.

Column 4, claim 1, in the formula, line 3, delete

"O=C-O O-$R^3$" and insert -- O=C-O-O-$R^3$ --.

Signed and Sealed this

Tenth Day of August 1976

[SEAL]

Attest:

RUTH C. MASON  
Attesting Officer

C. MARSHALL DANN  
Commissioner of Patents and Trademarks